United States Patent
Lin et al.

(10) Patent No.: US 6,922,793 B2
(45) Date of Patent: Jul. 26, 2005

(54) METHOD FOR RECOVERING FROM MALFUNCTIONS IN AN AGENT MODULE OF A MODULAR NETWORK DEVICE

(75) Inventors: Steven Tzu-Yun Lin, Hsinchu Hsien (TW); Li-Hua Wu, Hsinchu Hsien (TW)

(73) Assignee: Accton Technology Corporation, Hsinchu (TW)

( * ) Notice: Subject to any disclaimer, the term of this patent is extended or adjusted under 35 U.S.C. 154(b) by 584 days.

(21) Appl. No.: 10/074,040

(22) Filed: Feb. 14, 2002

(65) Prior Publication Data

US 2003/0154431 A1 Aug. 14, 2003

(51) Int. Cl.[7] .............................................. G06F 11/00
(52) U.S. Cl. ...................................... 714/12; 370/219
(58) Field of Search ................................ 370/219, 244; 714/7, 12, 41

(56) References Cited

U.S. PATENT DOCUMENTS

| | | | | |
|---|---|---|---|---|
| 5,016,244 A | * | 5/1991 | Massey et al. ............... | 370/217 |
| 5,922,077 A | * | 7/1999 | Espy et al. ..................... | 714/7 |
| 6,148,410 A | * | 11/2000 | Baskey et al. ................. | 714/4 |
| 6,272,113 B1 | * | 8/2001 | McIntyre et al. ............ | 370/248 |
| 6,285,656 B1 | * | 9/2001 | Chaganty et al. ............ | 370/228 |
| 6,728,748 B1 | * | 4/2004 | Mangipudi et al. .......... | 718/105 |
| 2002/0097672 A1 | * | 7/2002 | Barbas et al. ................ | 370/216 |
| 2002/0176355 A1 | * | 11/2002 | Mimms et al. .............. | 370/216 |

* cited by examiner

*Primary Examiner*—Scott Baderman
*Assistant Examiner*—Paul F. Contino
(74) *Attorney, Agent, or Firm*—Birch, Stewart, Kolasch & Birch, LLP

(57) ABSTRACT

A method for recovering from malfunctions in a primary agent module of a modular network device. The primary agent module is installed in a modular network device having a number of network interface modules housed in a chassis. A backup agent module is installed in the chassis when the modular network device is powered on. The backup agent module determines if the primary agent module has been installed when three dedicated signals of the primary agent module are asserted. The network device then synchronizes all configuration information of the network interface modules from the primary to the backup agent module. The backup agent module detects that the primary agent module has failed if it cannot receive a message sent from the primary agent module within a predetermined time interval. As a result, the modular network device is rebooted and the backup agent module becomes the primary agent module.

12 Claims, 5 Drawing Sheets

METHOD FOR RECOVERING FROM MALFUNCTIONS IN AN AGENT MODULE OF A MODULAR NETWORK DEVICE

FIELD OF THE INVENTION

The present invention relates generally to modular network devices and, in particular, to modular switches having redundancy in both management and system controller functions.

BACKGROUND OF THE INVENTION

A typical computer network consists of nodes (computers), a connecting medium (wired or wireless), and specialized network equipment like routers and hubs. In the case of the Internet, all these pieces working together allow one computer to send information to another computer that may be on the other side of the world. Switches are a fundamental part of most networks. They make it possible for several users to send information over a network at the same time without slowing each other down. Just like routers allow different networks to communicate with each other, switches allow different nodes of a network to communicate directly with each other in a smooth and efficient manner.

Modular architecture has been developed for designing network equipment. The use of modular design provides flexibility and future proofing to keep up with the demands of any growing network. Typically, modular network devices such as modular switches have an agent module and one or more network interface modules housed in a multiple slot chassis. Each interface module installed in the chassis provides internal switching to prevent bandwidth bottlenecks from slowing down the entire network. The agent module combines a switch fabric with management functions to monitor and control switching for the modular switch. However, such an agent module is critical to the operation of a network because it often represents a potential single point of failure that may prevent either the entire network or a substantial portion of the network from functioning. What is needed, therefore, is a reliable modular switch that provides a backup for the agent module.

SUMMARY OF THE INVENTION

It is an object of the present invention to provide a method of recovering from malfunctions in an agent module installed in a modular network device.

It is another object of the present invention to provide a mechanism to establish redundant management and system controller functions in a modular network device.

The present invention is directed to a method of recovering from malfunctions in a first agent module that is installed in a modular network device having a number of network interface modules housed in a chassis, in which the first agent module performs management and system controller functions. According to the invention, a second agent module is installed in the chassis and a present signal of the second agent is automatically asserted to notify the first agent module that the second agent module is present. The second agent module determines if the first agent module is installed when a present signal, a ready signal and a privilege signal of the first agent module are asserted. After a ready signal of the second agent module is asserted, the network device synchronizes all configuration information of the network interface modules from the primary to the backup agent module. The first agent module periodically sends a message indicating that the first agent module has not failed to the second agent module during normal operation. The second agent module detects the malfunctions in the first agent module if the second agent module cannot receive the message within a predetermined time interval. Consequently, the modular network device reboots and the second agent module employs the synchronized configuration information to continue to perform the management and system controller functions.

In accordance with another aspect of the invention, there is provided a method of establishing redundant management and system controller functions in a modular network device having a number of network interface modules housed in a chassis. When the modular network device is powered up, the device boots with a first agent module installed in a first slot of the chassis and a second agent module installed in a second slot of the chassis. If a privilege signal of the first agent module is asserted and a privilege signal of the second agent module is de-asserted, the first agent module determines its role as a primary agent module and the second agent module determines its role a backup agent module. After a ready signal of the first agent module and a ready signal of the second agent module are both asserted, the modular network device synchronizes all configuration information of the network interface modules from the first agent module to the second agent module. The first agent module periodically sends a message indicating that the first agent module has not failed to the second agent module during normal operation. The second agent module detects that the first agent module has failed if the second agent module cannot receive the message within a predetermined time interval. As a result, the modular network device reboots and the second agent module employs the synchronized configuration information to continue to perform the management and system controller functions.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be described by way of exemplary embodiments, but not limitations, illustrated in the accompanying drawings, which are given by way of illustration only, and thus are not limitative of the present invention, in which like elements denote similar elements, and in which.

DETAILED DESCRIPTION OF THE PREFERRED EMBODIMENT

Figure 1:
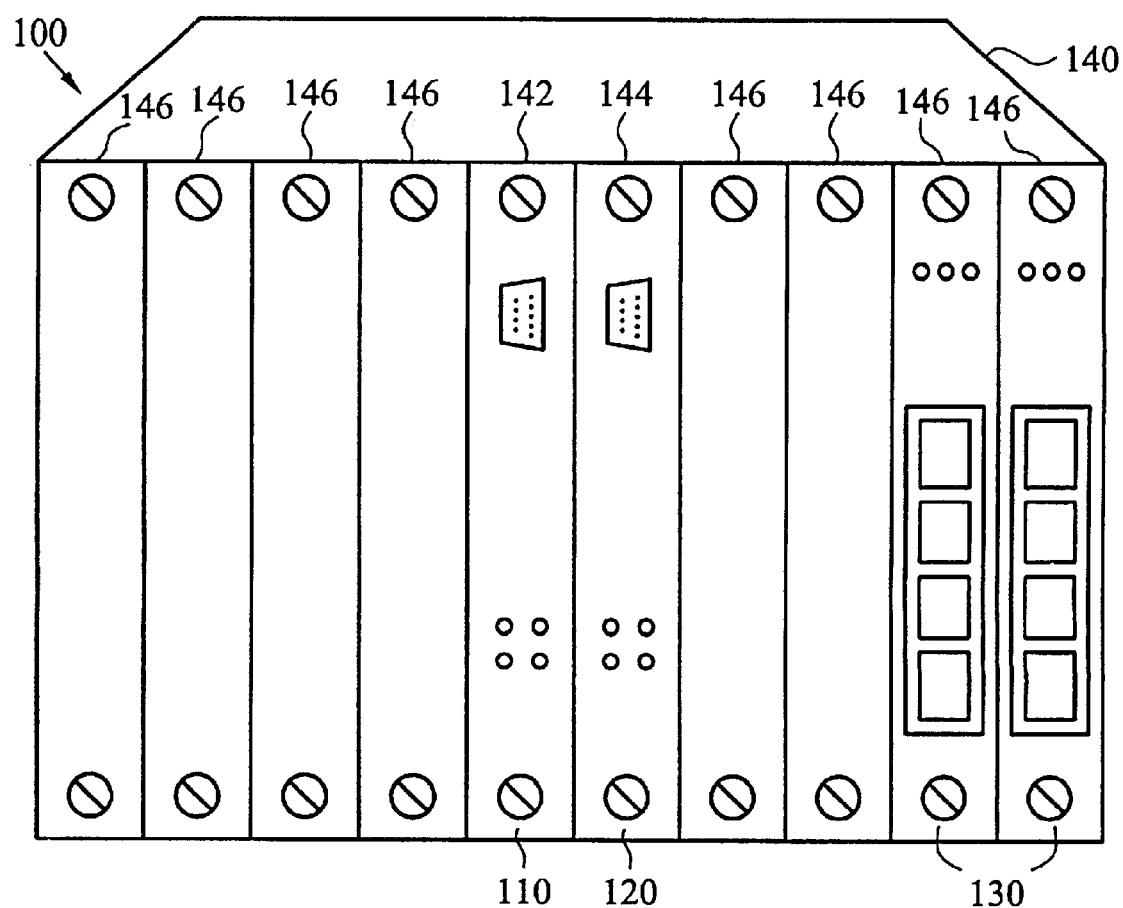
FIG. 1 is a perspective view of an exemplary modular network device according to the invention.

As illustrated in FIG. 1, a modular network switch 100, such as a modular routing switch, is housed in a chassis 140 including multiple slots that receive two types of modules. Network interface modules 130 can occupy any of the slots 146 of the chassis 140 and can be installed in any order. The network interface modules 130 cannot occupy slots 142 and 144, which are designated for agent modules 110, 120. With respect to a modular routing switch, the agent module 110 (120) performs two critical functions in the modular network device (hereinafter referred to as the system for brevity) 100: the central switch fabric and the management entity. Each network interface module 130 learns addresses of locally attached computers (nodes) and maintains a database. When the source port and destination port of a given packet are located on the same network interface module 130, the packet remains local to the network interface module 130 and is switched or routed between these ports. If the destination address of a given packet is not local, the network interface module 130 forwards the packet to the agent module 110 (120), which switches or routes the packet to the proper module or broadcasts it. Two agent modules 110, 120 are simultaneously installed in the slots 142, 144 as shown in FIG. 1 and two network interface modules 130 are installed in the chassis 140 for example. According to the invention, it is noted that only one agent module is required for normal operation. If the agent module is removed from a powered on system 100 that is functioning in a network, system operations will cease. However, if a backup agent module is installed in the chassis, and the primary agent module is removed or fails, the backup agent module will take over the operations. In addition, all modules support hot swapping, which means that network administrators can remove modules and install modules when the system 100 is powered on and operating. Hot swapping does not interfere with the general operation of the system 100.

To establish a redundant system management configuration, the system 100 must have two agent modules installed in the chassis 140. The slots for agent modules are slots 142 and 144. A redundant agent module configuration provides a seamless flow of management. If the administrator powers up or reboots the system 100 with two agent modules installed, the module 110 in the slot 142 becomes the primary agent module and the module 120 in the slot 144 becomes the backup module. However, if the administrator installs an agent module when the system 100 is powered on, the module installed earlier becomes the primary agent module and the agent module installed later becomes the backup agent module. The features of the invention will be more clearly understood from the following description of a preferred embodiment.

Figure 2:
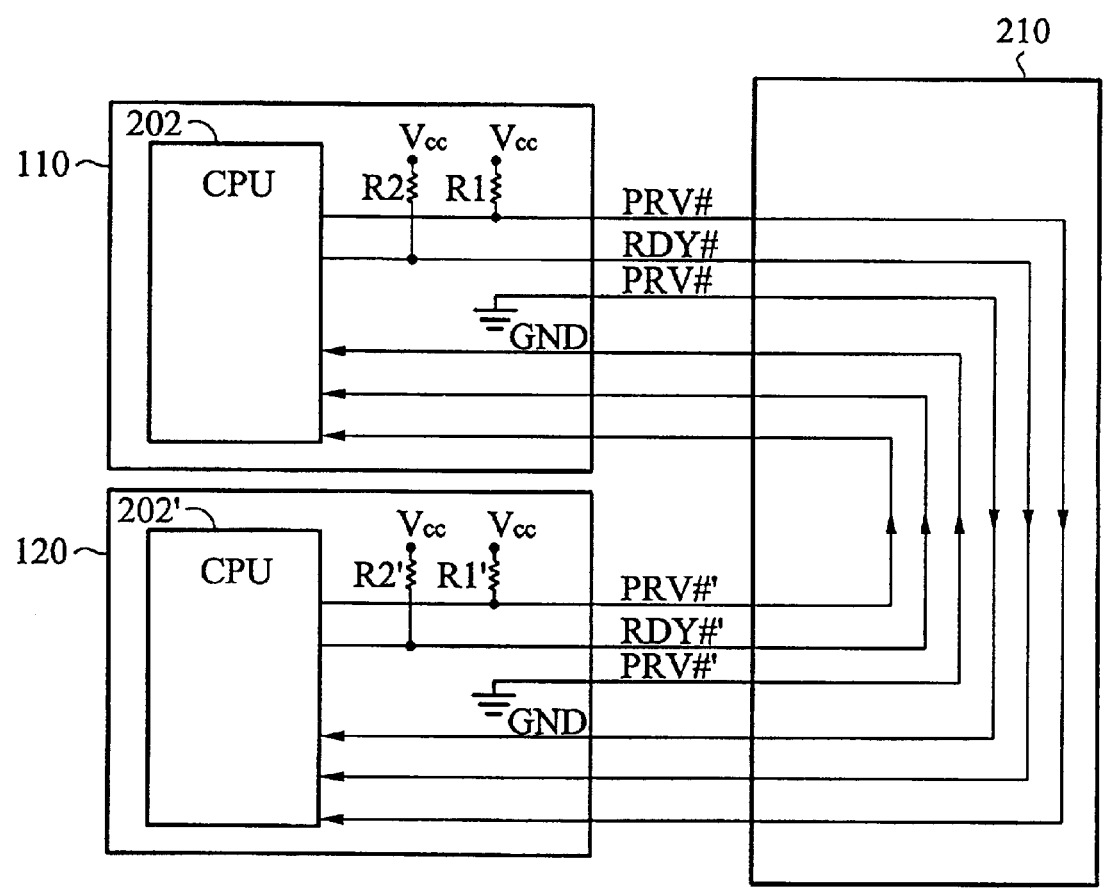
FIG. 2 is a schematic diagram of a preferred embodiment according to the invention.

Referring to FIG. 2, each agent module has three dedicated signals for determining the primary and backup agent modules in the modular network device 100. It should be appreciated that the agent modules 110 and 120 have substantially the same arrangement. Whenever the agent module 110 (120) is installed, a present signal PRT# (PRT#') is asserted by connecting it to ground automatically (where # denotes an active low trigger herein). A privilege signal PRV# (PRV#') is active only when the agent module 110 (120) determines its role as the primary agent module. Additionally, a ready signal RDY# (RDY#') is used to indicate that the agent module 110 (120) has completed an initialization process after system power-up or rebooting. As illustrated in FIG. 2, these signals are transmitted/received over backplane 210. Each agent module 110 (120) includes a central processing unit (CPU) 202 (202') to control the signals PRV# and RDY# (PRV#' and RDY#') and to detect the signals PRV#', RDY#' and PRT#' (PRV#, RDY# and PRT#) received from the other module 120 (110). The CPU 202 (202') also executes system software related to the switch fabric and management functions. As depicted, the signals PRV# (PRV#') and RDY# (RDY#') are optionally coupled to power source Vcc through R1 (R1') and R2 (R2').

The backplane 210, which is a star-wired scheme of traces inside the system 100, is used to connect each network interface module slot 146 to the agent module slots 142 and 144. The backplane 210 supports system communication between the agent module 110 (120) and network interface modules 130 for control signals, detection, and other management activities. Backplane connector on each module (not shown) provides easy access to all services from the system backplane. The backplane 210 preferably comprises a data channel for network traffic between the agent module 110 (120) and network interface module, and a control channel that passes signals for module detection. The backplane 210 also includes a communication channel that operates between two agent modules 110, 120 to keep their configuration synchronized. Traffic between ports on the same network interface module 130 does not enter the backplane 210, that is, the interface modules 130 provide switching when the packet's destination is a locally attached node. The interface modules 130 send packets that have non-local destination addresses across the backplane 210 to the agent module 110 (120) which then switches the packets to the appropriate interface module 130.

Figure 3:
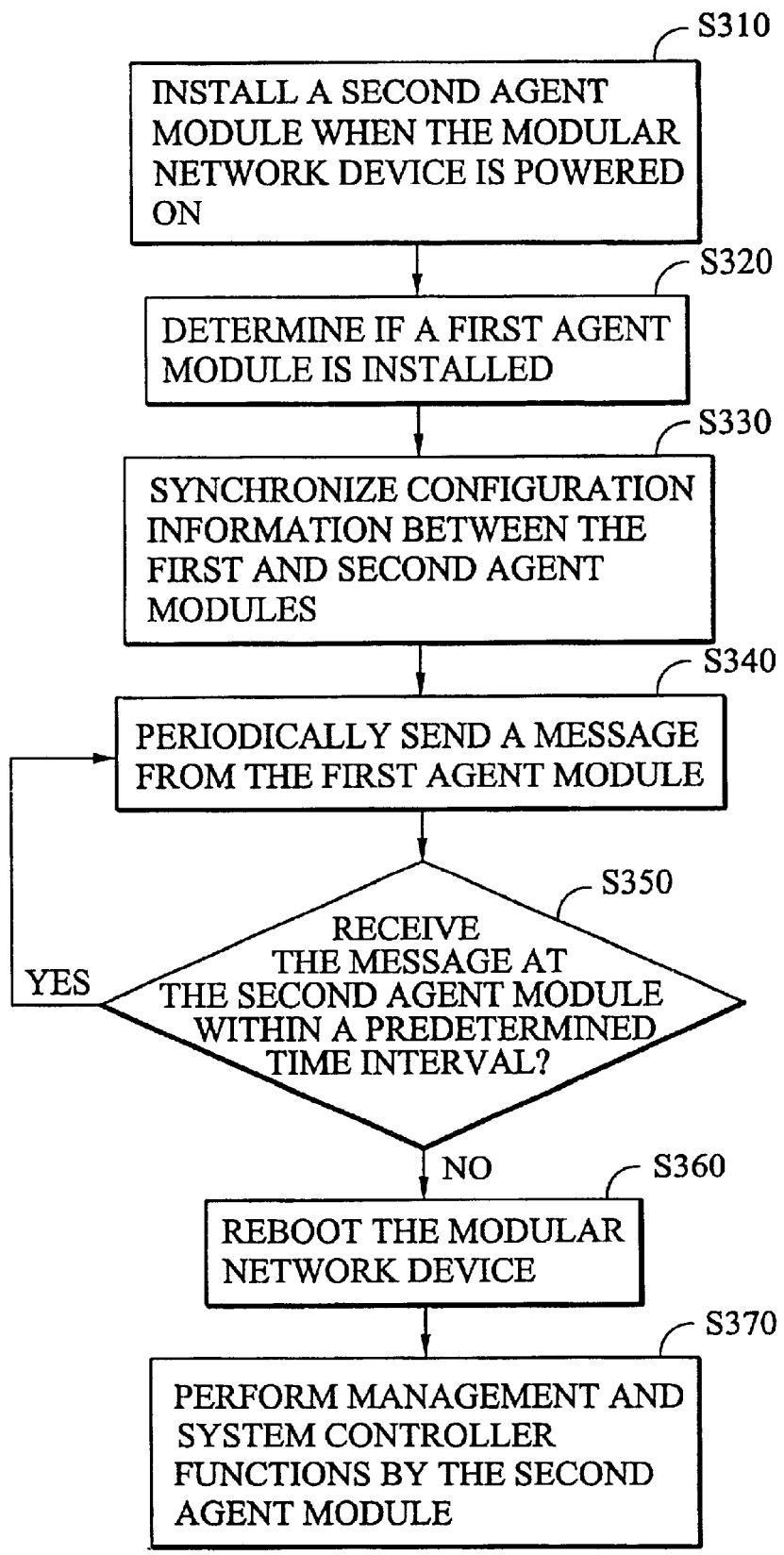
FIG. 3 is a flowchart illustrating the operation of the invention.

The operation of the invention is illustrated in more detail by a flowchart depicted in FIG. 3. When the system 100 is powered on and the agent module 110 (120) is operating, the agent module 120 (110) is installed in the chassis to establish redundancy in both management and system controller functions (step S310). The agent module 120 (110) asserts its present signal PRT#' (PRT#) automatically to notify the agent module 110 (120) that the agent module 120 (110) is present. The agent module 120 (110) determines if the agent module 110 (120) is installed when the signals PRT#, RDY# and PRV# (PRT#', RDY#' and PRV#') are asserted (step S320). After the ready signal RDY#' (RDY#) of the agent module 120 (110) is asserted, the system synchronizes all configuration information of the network interface modules 130 from the agent module 110 (120) to the agent module 120 (110) (step S330). The system treats both agent modules as a single logical device. The agent module 120 (110) operates in hot standby mode, which means that it is constantly kept informed about the dynamic state of the management activities that are occurring on the agent module 110 (120). When any configuration data is modified on the agent module 110 (120), the system re-synchronizes the agent module 120 (110) to the agent module 110 (120).

During normal operation, the agent module 110 (120) periodically sends a message to the agent module 120 (110) (step S340). The agent module 120 (110) detects malfunctions in the agent module 110 (120) if the agent module 120 (110) cannot receive the message within a predetermined time interval (step S350). The modular network device 100, including the agent modules 110 and 120, therefore reboots (step S360). After rebooting the system, the agent module 120 (110) asserts its ready signal RDY'# (RDY#) to indicate that the agent module 120 (110) has completed an initialization process. The agent module 120 (110) subsequently asserts its privilege signal PRV#' (PRV#) to indicate that the agent module 120 (110) is ready to take over the management and system controller functions previously performed by the agent module 110 (120). If the agent module 110 (120) recovers to a normal operating condition, the agent module 110 (120) de-asserts its privilege signal PRV# (PRV#'). The agent module 110 (120) determines if the agent module 120 (110) takes over all management and system functions when the signals PRT#', RDY#' and PRV#' (PRT#, RDY# and PRV#) are asserted. The agent module 110 (120) still remains in backup state unless the system is booted again. In this way, the agent module 120 (110) employs the synchronized configuration information to continue to perform the management and system controller functions (step S370).

Figure 4:
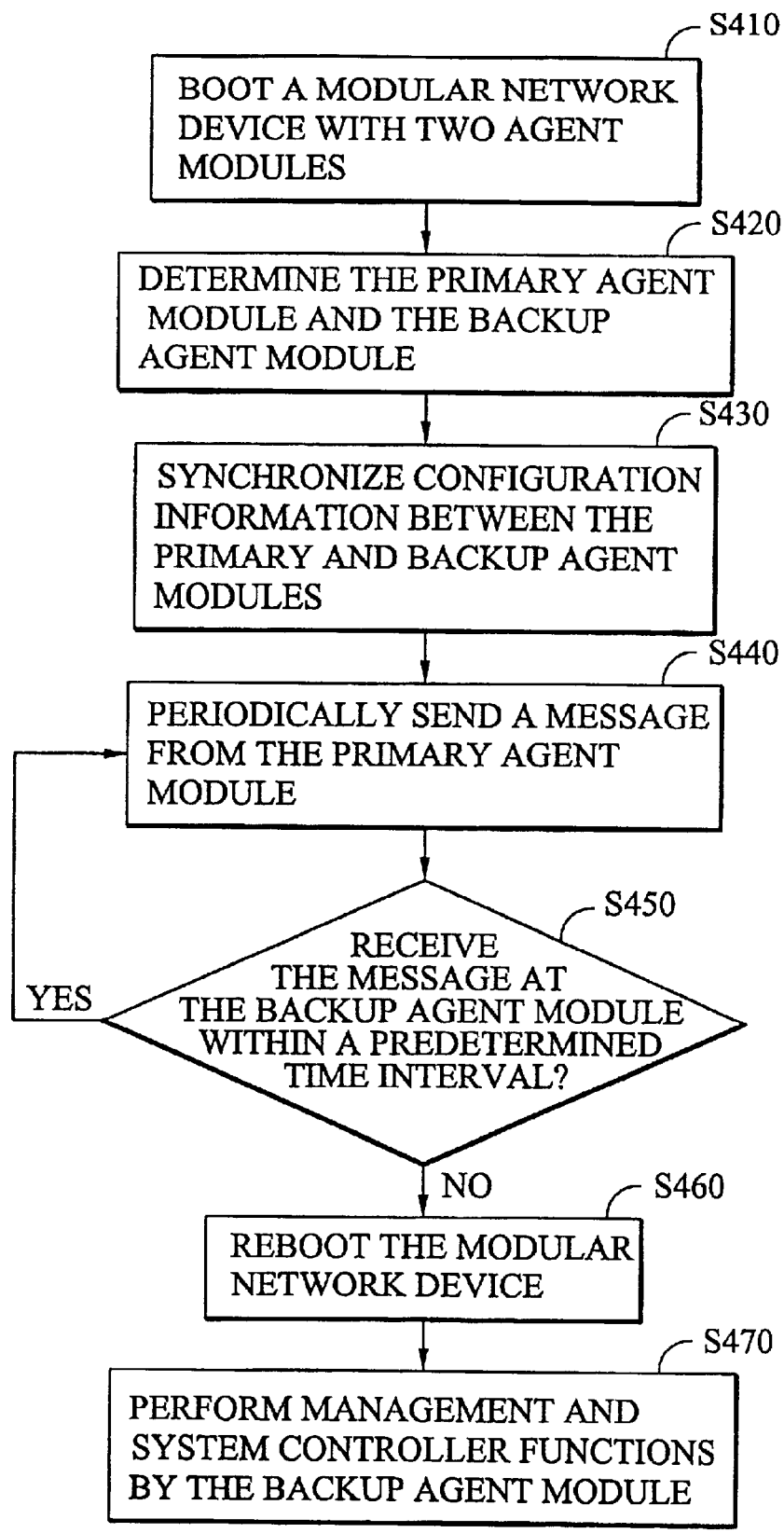
FIG. 4 is a flowchart illustrating the alternative operation of the invention.

When powering up or booting the system 100 with two agent modules, the module in slot 142 becomes the primary agent module and the module in slot 144 becomes the backup agent module. Referring to FIG. 4, the system 100 is powered up or booted with the agent module 110 installed in the slot 142 and the agent module 120 installed in the slot 144 (step S410). The agent modules 110 and 120 assert their present signals PRT# and PRT#' respectively to notify both agent modules that the agent module 110 and the agent module 120 are installed. The agent module 110 asserts its privilege signal PRV# to indicate that the agent module 110 in the slot 142 serves as the primary agent module. The agent module 120 in the slot 144 detects that the privilege signal PRV# of the agent module 110 is asserted and then the agent module 120 holds its privilege signal PRV#' de-asserted. When the privilege signal PRV# is asserted and the privilege signal PRV#' is de-asserted, the agent module 110 determines its role the primary agent module and the agent module 120 determines its role the backup agent module (step S420). Next, the agent modules 110 and 120 individually assert the ready signals RDY# and RDY#' when the agent modules 110 and 120 respectively complete an initialization process. After the ready signals RDY# and RDY#' are both asserted, the system synchronizes all configuration information of the network interface modules 130 from the primary agent module to the backup agent module (step S430). When any configuration data is modified on the primary agent module, the system re-synchronizes the backup agent module to the primary agent module.

During normal operation, the primary agent module periodically sends a message to the backup agent module (step S440). The backup agent module detects that the primary agent module has failed or been removed for any reason if the backup agent module cannot receive the message within a predetermined time interval (step S450). The modular network device 100, including the agent modules 110, 120, thus reboots (step S460). After rebooting the system, the backup agent module 120 asserts its ready signal RDY'190 to indicate that the agent module 120 has completed an initialization process. The agent module 120 subsequently asserts its privilege signal PRV#' to indicate that the backup agent module 120 is ready to take over the management and system controller functions previously performed by the primary agent module 110. If the primary agent module 110 can recover to a normal operating condition, the agent module 110 de-asserts its privilege signal PRV#. The agent module 110 determines if the agent module 120 has taken over all management and system functions when the signals PRT#', RDY#' and PRV#' are asserted. According to the invention, the system does not switch the primary state back to the original primary agent module 110 unless the system is booted again. Since the agent module 120 learns all the configuration settings from the primary agent module, the agent module 120 continues to perform the management and system controller functions (step S470).

According to the invention, if any configuration information is modified on the primary agent module or the system is rebooted, the primary agent module synchronizes its configuration information with the backup agent module.

Figure 5:
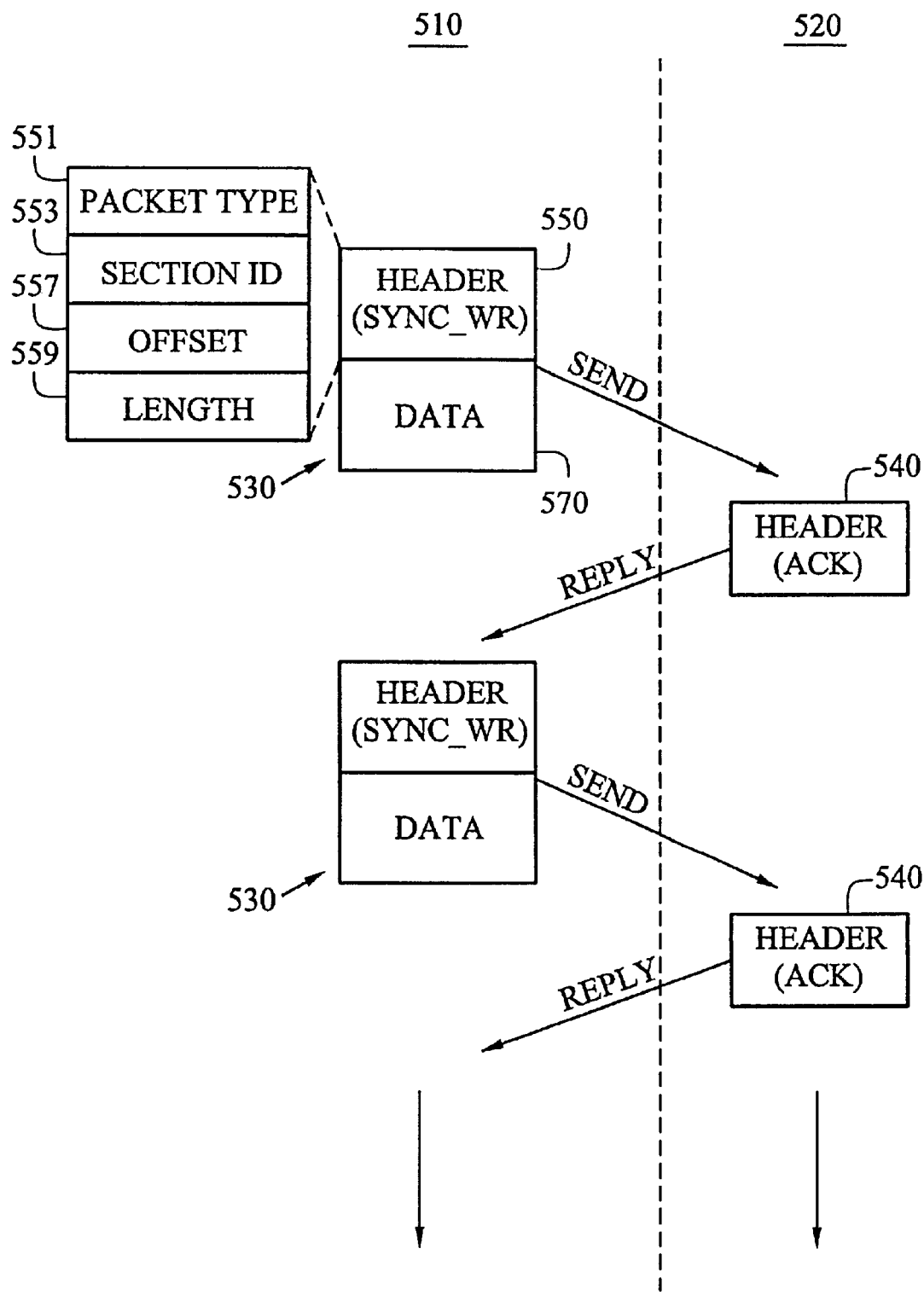
FIG. 5 illustrates a process flow diagram useful in understanding the synchronization in accordance with the invention.

FIG. 5 is a process flow diagram illustrating the synchronization. Briefly, primary agent module 510 transmits a data packet 530 to backup agent module 520. Each data packet 530 includes a header 550 and data 570 associated with the configuration information. In one embodiment, the header 550 has a field 551 indicative of a packet type, for example, packet transmission type SYNC_WR. As depicted, the header 550 may have a field 553 designated to SECTION ID which denotes a section identifier of a memory. The header also has a field 557 designated to OFFSET and a field 559 designated to LENGTH, which denote a data offset in the memory section and a length of the data 570 respectively. If the received data is correct, the backup agent 520 acknowledges the data transmission by returning an answer packet 540 to the primary agent module 510. As depicted, the answer packet 540 is the header 550 having the field 551 indicative of a packet acknowledgement type ACK. Therefore, the primary agent module 510 receives the answer packet 540 if the prior transmission is successful. The above-described procedure is repeated until all of the configuration information is completely transferred.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of recovering from malfunctions in a first agent module that is installed in a modular network device having a plurality of network interface modules housed in a chassis where the first agent module performs management and system controller functions, the method comprising the steps of:

installing a second agent module in the chassis and asserting a present signal of the second agent to notify the first agent module that the second agent module is present;

determining, at the second agent module, if the first agent module is installed when a present signal, a ready signal and a privilege signal of the first agent module are asserted;

synchronizing configuration information of the network interface modules from the first agent module to the second agent module after a ready signal of the second agent module is asserted, wherein the synchronizing step comprises:

transmitting a data packet having a header and data associated with the configuration information from the first agent module to the second agent module;

acknowledging the data transmitting step by returning an answer packet from the second agent module to the first agent module;

receiving the answer packet at the first agent module; and repeating the transmitting, the replying and the receiving steps until all of the configuration information is completely transferred;

wherein the header in the data packet comprises a field indicative of a packet transmission type;

wherein the answer packet is the header having the field indicative of packet acknowledgement type;

periodically sending a message, from the first agent module to the second agent module, indicating that the first agent module has not failed;

detecting, at the second agent module, that the malfunctions in the first agent module occur if the second agent module cannot receive the message within a predetermined time interval;

rebooting the modular network device including the first agent module and the second agent module; and performing the management and system controller functions by the second agent module using the synchronized configuration information.

2. The method as recited in claim 1 further comprising the step of:

re-synchronizing the second agent module to the first agent module when any configuration information is modified on the first agent module.

3. The method as recited in claim 2 further comprising the steps of:

asserting the ready signal of the second agent module after the rebooting step to indicate that the second agent module has completed an initialization process; and asserting a privilege signal of the second agent module to indicate that the second agent module has taken over the management and system controller functions previously performed by the first agent module.

4. The method as recited in claim 3 further comprising the steps of:

if the first agent module recovers to a normal operating condition after the rebooting step, performing the steps of:

de-asserting the privilege signal of the first agent module; and determining, at the first agent module, if the second agent module has taken over the management and system controller functions when the present, ready and privilege signals of the second agent module are asserted.

5. The method as recited in claim 1 wherein the second agent module is installed when the modular network device is powered on.

6. The method as recited in claim 1 wherein the first agent and the second agent modules have substantially the same arrangement.

7. A method of establishing redundant management and system controller functions in a modular network device having a plurality of network interface modules housed in a chassis, comprising the steps of:

booting the modular network device with a first agent module installed in a first slot of the chassis and a second agent module installed in a second slot of the chassis;

determining if the first agent module is a primary agent module and the second agent module is a backup agent module when a privilege signal of the first agent module is asserted and a privilege signal of the second agent module is de-asserted;

synchronizing configuration information of the network interface modules from the first agent module to the second agent module after a ready signal of the first agent module and a ready signal of the second agent module are both asserted, wherein the synchronizing step comprises:

transmitting a data packet having a header and data associated with the configuration information from the first agent module to the second agent module;

acknowledging the data transmitting step by returning an answer packet from the second agent module to the first agent module;

receiving the answer packet at the first agent module; and repeating the transmitting, the replying and the receiving steps until all of the configuration information is completely transferred;

wherein the header in the data packet comprises a field indicative of a packet transmission type;

wherein the answer packet is the header having the field indicative of packet acknowledgement type;

periodically sending a message, from the first agent module to the second agent module, indicating that the first agent module has not failed;

detecting, at the second agent module, that the first agent module has failed if the second agent module cannot receive the message within a predetermined time interval;

rebooting the modular network device including the first agent module and the second agent module; and performing the management and system controller functions by the second agent module using the synchronized configuration information.

8. The method as recited in claim 7 further comprising the steps of:

respectively asserting, when the modular network device is powered up, a present signal of the first agent module and a present signal of the second agent module to notify both agent modules that the first and the second agent modules are installed;

asserting the privilege signal of the first agent module to indicate that the first agent module in the first slot serves as the primary agent module;

detecting, at the second agent module, that the privilege signal of the first agent module is asserted;

holding the privilege signal of the second agent module de-asserted; and individually asserting the ready signal of the first agent module and the ready signal of the second agent module when the first and the second agent module respectively complete an initialization process.

9. The method as recited in claim 8 further comprising the step of:

re-synchronizing the second agent module to the first agent module when any configuration information is modified on the first agent module.

10. The method as recited in claim 9 further comprising the steps of:

asserting the ready signal of the second agent module after the rebooting step in order to indicate that the second agent module has completed the initialization process; and asserting the privilege signal of the second agent module to indicate that the second agent module has taken over the management and system controller functions previously performed by the first agent module.

11. The method as recited in claim 10 further comprising the steps of:

if the first agent module recovers to a normal operating condition after the rebooting step, performing the steps of:

de-asserting the privilege signal of the first agent module; and determining, at the first agent module, if the second agent module has taken over the management and system controller functions when the present, the ready and the privilege signals of the second agent module are asserted.

12. The method as recited in claim 7 wherein the first agent and the second agent modules have substantially the same arrangement.

* * * * *